N. HOUCK.
RAILROAD GATE.
No. 66,344.   Patented July 2, 1867.
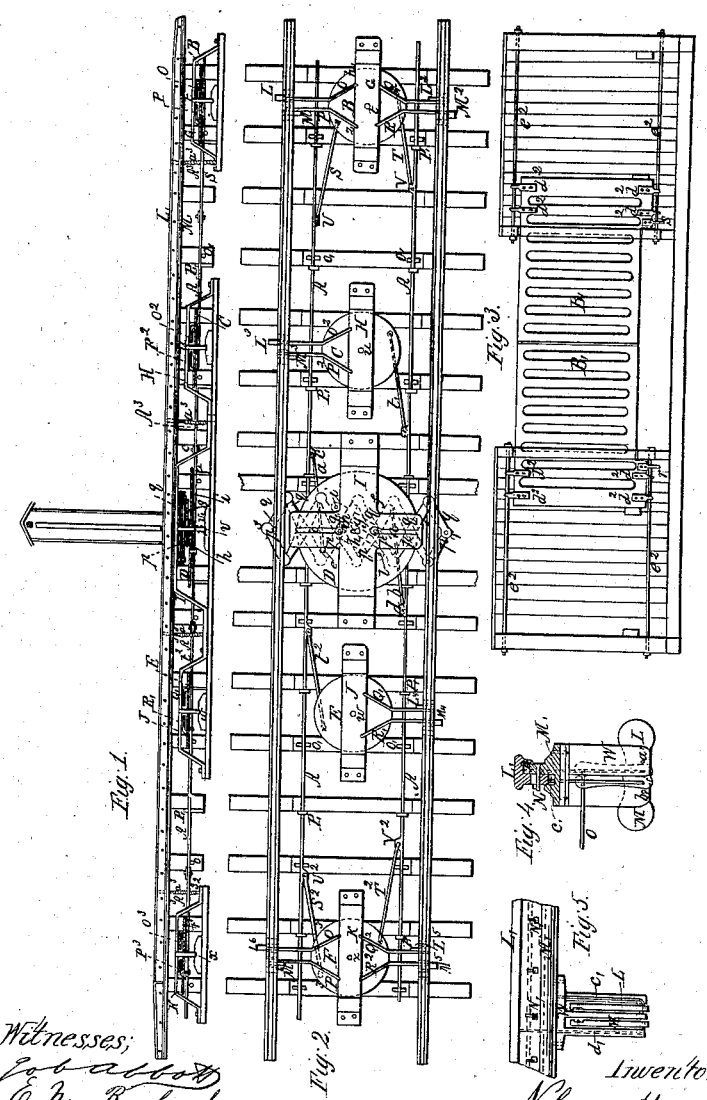

United States Patent Office.

NELSON HOUCK, OF CANTON, OHIO.

Letters Patent No. 66,344, dated July 2, 1867.

---

IMPROVED RAILROAD-GATE.

---

The Schedule referred to in these Letters Patent and making part of the same.

---

TO ALL WHOM IT MAY CONCERN:

Be it known that I, NELSON HOUCK, of Canton, in the county of Stark, and State of Ohio, have invented new and useful improvements in Self-Operating Railroad-Gates; and I do hereby declare that the following is a full, clear, and exact description of my invention, reference being had to the accompanying drawings, forming a part of this specification, and to the letters of reference marked thereon, of which drawings—

Figure 1 is a sectional view of my improved railroad-gate.

Figure 2 is a plan of same with the gate detached.

Figure 3 is a view of gates detached from the other machinery.

Figures 4 and 5 are views of that part of the machinery that is connected to the rails.

The nature of my invention consists in the peculiar arrangement of several rock-levers, rods, turning-plates, springs, and other machinery, in connection with compound rails and sliding gates, so arranged as that the weight of the train shall cause the gates to open, and to remain open until the train has passed, when, by action of certain springs, the gates close themselves, and will remain closed until again opened by a train.

To enable others skilled in the art to make and use my invention, I will proceed to describe its construction and operation.

The connecting-rods A A are placed on the ties which support the track, and have rollers $o$ under them, to allow of their easy motion. They also pass through the irons $P_1$, which keep them in position. The turning-plates B C D E F are arranged on the axles $t\ u\ v\ w\ x$, the lower ends of these axles resting in steps provided for the purpose, which steps are attached to planks which are fastened to the ties, and the upper end of the axles being held by the irons G H I J K, which are attached to the planks before mentioned, all of which is fully shown in fig. 1. The rods S T $S_2$ $T_2$ are attached to the under side of the turning-plates B and F by bolts, as shown, and their other ends are attached to the pieces U V $U_2$ $V_2$ on the connecting-rods A A. The rods $t_1\ t_2$ are attached to the turning-plates C and E and the connecting-rods A A in a similar manner. The rods $a$ and $b$ are attached to the pieces $c$ and $d$, on the connecting-rods A A, and to the under side of the turning-plate D, by the bolts $e$ and $f$. The bars $g$ and $h$ are attached to the upper side of the turning-plate D by the bolts $i$ and $l$, and at their other ends are the bolts $k$ and $m$, which bolts pass through two of the combined levers $p\ p\ q\ q$, and up through the slots $o$ and $n$ in the arms of the iron I, and have nuts on them, so as to support the combined levers $p\ p\ q\ q$. The ends of this set of combined levers are attached to the gates $B_1\ B_1$ by the bolts $r$ and $s$, which bolts are attached to the gates as shown in fig. 3, and pass through the ends $r$ and $s$ of the series of combined levers. The rods O and P are bent at their ends, and are put into the holes $h_1$ and $z_1$ in the turning-plate B, and the holes $h_2$ and $z_2$ in the rock-levers L and M. These rock-levers are hung on the axles $b_1$ and $a_1$ in the iron W, which is attached to the bottom of the compound rail $L_1\ M_1$, as shown in figs. 4 and 5. The iron W, with rock-levers L and M, is not shown in fig. 1, to avoid confusion. This compound rail is made in two parts, $L_1$ and $M_1$, which are of the cross-section shown in fig. 4, and are held together by the bolt $N_1$. The hole in the part $L_1$, through which passes the bolt $N_1$, is slotted as shown, so as to allow a vertical motion of the part L of the rail. The rods $A_3$, shown in fig. 1, are arranged with their upper ends against the part $L_1$ of the rails, and pass through a plank and box attached to the ties. The upper ends of the springs $a_3$ pass through holes in the rods $A_3$, and rest on boxes, through which these rods pass, thus serving to keep the part $L_1$ of the rails elevated, excepting when pressed down by the weight of the train. The rods $c_1$ and $d_1$ are bent at their lower ends, and are inserted in holes in the rock-levers L and M, while their upper ends press against the part $L_1$ of the compound rail $L_1$ and $M_1$, as shown in figs. 4 and 5. The arrangement of the rods Q and R, and rock-lever $L_2$ and $M_2$, as well as that of the rods $O_2$ and $P_2$ and the rock-levers $L_3$ and $M_3$, the rods $Q_1$ and $R_1$, and rock-levers $L_4$ and $M_4$, the rods $Q_2$ and $R_2$ and rock-levers $L_5$ and $M_5$, and the rods $O_3$ and $P_3$ and rock-levers $L_6$ and $M_6$, taken in connection with the turning-plates B C D E F, respectively, are similar to that of the rods O and P, and rock-levers L and M, with the turning-plate B, and need not be separately described. The gates $B_1\ B_1$ are hung with the irons $d_2\ d_2$ on the rods $e_2\ e_2$, and are free to slide through the slots provided in the gate-posts nearest the track, and have bumpers on their rear ends, to take the blow when the gates are thrown violently open; all of which is shown in fig. 3.

The operation of my apparatus is as follows: A train of cars coming on to the part $L_1$ of the compound rail, forces it down. This forces down the rods $c_1$ and $d_1$, which operate the rock-levers L and M, and these in turn act on the rods O and P, and cause the turning-plate B to turn. This causes a movement of the connecting-rods A A by means of the rods S and T, and the rods $a$ and $b$, attached to the turning-plates D, cause said plates to turn. The rotation of the turning-plate D causes the bars $g$ and $h$ to act on the bolts $k$ and $m$, and this action causes a movement of the combined levers $p\ p\ q\ q$ in such a manner as that the distance $m\ k$ shall be increased, which movement of these combined levers will cause the ends $r$ and $s$ to move away from the track, and as the bolts $r$ and $s$ are attached to the gates $B_1\ B_1$, causes said gates to slide open. The direction of movements of the several parts of my apparatus, as caused by a train, is indicated by arrows. The action of a train coming on to the apparatus, at the end where the turning-plate F is placed, is precisely similar to that just described. The turning-plates C and E, being connected to the connecting-rods A A, are caused to rotate by the movement just described, and when a train leaves the rails over the rock-levers $L_1\ M_1$, it comes over the rock-levers $L_3\ M_3$, and the gates are prevented from closing. In the same manner, the train comes over the rock-levers $L_4\ M_4$, after leaving the rock-levers $L_3\ M_3$, and then over the rock-levers $L_5\ M_5\ L_6\ M_6$, and the gates cannot close until the last car has passed the rock-levers $L_6\ M_6$. The spring $v_1$, on axle $v$ of the turning-plate D, causes the plate D to rotate back into its original position, as shown, as the passing of the train leaves the part $L_1$ of the rail to rise, and in this way the gates are closed.

I do not claim as my invention sliding-gates $B_1\ B_1$, or, in fact, any part of the apparatus shown in fig. 3; nor do I claim the form of rail shown in fig. 4, as any form of compound rail, where the upper part can have a vertical motion, can be used in connection with my apparatus, and as the sliding-gates and a similar cross-section of rail have been heretofore used; but what I do claim, and desire to secure by Letters Patent, is—

1. The peculiar arrangement and combination of the part $L_1$ of the rail $L_1\ M_1$, the rods $c_1\ d_1$, rock-levers L M, rods O P, and turning-plate B, the several parts being arranged as and for the purpose set forth.

2. The peculiar arrangement and combination of the turning-plates B C D E F, rods $S\ T\ t_1$, $a\ b\ t_2\ S_2\ T_2$, connecting-rods A A, bars $g\ h$, and combined levers $p\ p\ q\ q$, the several parts being arranged as and for the purpose set forth.

3. The spring $v_1$, when used in connection with the axle $v$ of the turning-plate D, substantially in the manner and for the purpose specified.

4. The rods $A_3$ with springs $a_3$, when used in connection with the part $L_1$ of the compound rail $L_1\ M_1$, substantially in the manner and for the purpose specified.

5. The vertically slotted holes, either in the part $L_1$ or the part $M_1$ of the compound rail $L_1\ M_1$, when such slots are used for the purpose of allowing a vertical motion to the part $L_1$, substantially in the manner and for the purpose specified.

As evidence that I claim the foregoing, I have hereunto set my hand in presence of two witnesses.

NELSON HOUCK.

Witnesses:
   E. N. BEEBOUT,
   JOB ABBOTT.